Jan. 26, 1943. L. ILLMER 2,309,397
PROTECTIVE JOURNAL BEARING MEANS
Filed May 21, 1941

Inventor
Louis Illmer.

Patented Jan. 26, 1943

2,309,397

UNITED STATES PATENT OFFICE 2,309,397

PROTECTIVE JOURNAL BEARING MEANS

Louis Illmer, Cortland, N. Y.

Application May 21, 1941, Serial No. 394,520

6 Claims. (Cl. 308—35)

This invention broadly relates to lubricated high speed rotor sustaining bearings of the free running, plain bore type providing for a uniformly smooth and rigidly retained bore surface adapted to floatingly carry a substantially steady journal load thereon, and more particularly pertains to an improved heavy duty, horizontal journal that may be radially loaded within such bore to set up a unitary wedge-shaped oil film between these rubbing surfaces while running at full normal speed. The problem herein solved has to do with fully and economically protecting the original high polish of such mated surfaces against attrition at all rotor speeds when sustaining a comparatively heavy unit load in excess of a certain critical pressure.

The relatively long conventional journal bearings of a like type now commonly used in larger sizes of fast running electric motors and generators, steam turbines, rotary pumps and the like machinery, are generally being operated at a comparatively low unit pressure when subjected to a dead-load of considerable magnitude. Such easement prevents the shell loading from falling upon a restricted contact area at high pressure intensity in excess of said critical pressure while a highly polished journal slowly comes to rest and the accompanying reduced oil film thickness no longer suffices to keep the rubbing surfaces properly separated against abrasive wear.

Standard plain bearing shells of this kind usually work with a rigid straight bore somewhat larger than the journal diameter with a fixed fit allowance of around one-thousandth of an inch per inch of journal diameter. This affords adequate clearance for the unrestrained formation of an interposed eccentric oil film upon which a fast rotating journal may effectively ride in unbroken oil borne fashion without allowing the minimum of journal approach to come into direct metallic contact relative to its surrounding shell.

At a peripheral journal speed of more than one thousand feet per minute, such unitary film formation is capable of sustaining a well distributed downward load considerably beyond that usually resorted to in present-day high speed bearing practice. The basis for the low unit pressure now prevailing is primarily fixed by satisfactory starting or stopping requirements, also acceptable journal wear.

The load upholding power of an underlying eccentric oil film drops materially during slow speed running. The resulting non-distributed or concentrated chordwise shell loading is likely to become sufficiently high and exceed said certain critical pressure intensity so as to break down an incipient oil film, permitting a slowly rotating journal to directly touch the shell bore in intermeshed metallic contact. Thereupon sliding boundary or partial solid frictional drag prevails and this rising drag is attended by bearing abrasion. During starting and stopping periods, such behavior leads to ultimate roughening and marring of mated rubbing surfaces that were originally superfinished. My bearing improvements contemplate the use of a supplemental stepped journal support or reserve seating agency that protectively cooperates with the bearing shell bore in automatically picking up and without pernicious shock, transferring the journal load thereon prior to allowing the cited intermeshed metallic contact to occur.

Unless such contact is averted, the journal of a heavy fast running rotor working with a relatively high bearing pressure, is likely to suffer serious abrasion during the considerable time period that may elapse in bringing the fast running rotor into static condition. By preserving the rubbing surfaces in an initially smooth condition without abrasive wear, a higher allowable film pressure may safely be utilized and this in turn improves bearing efficiency. My preferred type of seating agency comprises a series of localized bottom roller units that are automatically released from duty and come to rest when not in active service. Such similar outer raceways are purposely kept materially smaller in size than the journal diameter. My light weight multiple roller units possess a far greater load carrying capacity per inch of race diameter than do larger units; furthermore these smaller races are proportionately much lower in first cost and may be more advantageously installed than a solitary roller race that circumscribes the journal axis.

The principal object of the present invention is to devise a compact and low cost high speed plain bore bearing of the indicated protective character capable of efficiently maintaining the original finish of a highly polished journal at all speeds and shall afford an inherently large loading capacity per unit of projected area without encountering abrasive wear troubles during the stopping and starting periods. Embodied herein are also the adaptation of relatively small sized roller races and other structural refinements that promote the end in view.

Reference is had to the one sheet of drawings which disclose a preferred embodiment and in which drawing:

Fig. 1 cross-sectionally represents a bearing assembly equipped with my devices; and Fig. 2 is an elevational end view thereof.

Figures 5, 6:
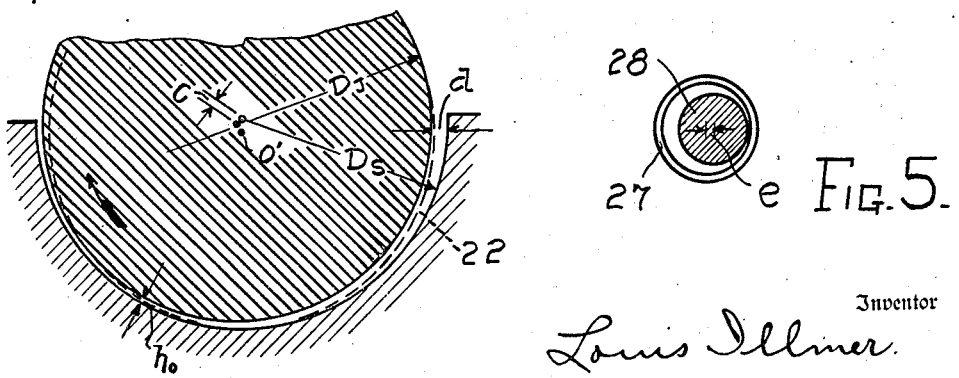
Fig. 5 is a cross-sectional view taken along 5—5 of Fig. 3.

Fig. 6 diagrammatically illustrates in exaggerated scale, the relation of a lifted journal with respect to its bore clearance.

A horizontal heavy duty bearing of this kind may comprise axially split lower and upper semicylindrical or plain bore shell components, respectively designated as 10 and 11. The housing pedestal 12 may be spherically socketed at 14 to pivotally mount the lower shell thereon. The demountable cap 15 may similarly seat the upper shell for conjoined rocking in conventional fashion but which split shell is fixedly retained against endwise or rotative movement.

Each upheld end of the rotor shaft 16 may be provided with a cylindrical journal 17 operatively entered into an associated shell bore. Lubricant of suitable viscosity may be supplied to the top feed port 18 or in any other suitable manner. The shaft 16 may be equipped with an oil sealed centering collar 21. The present improvements are primarily concerned with a modification over conventional practice in the lower plain shell 10 of which the respective ends may be reversely counterbored at 19 without requiring any corresponding modification on part of the upper shell 11. The common uniform main bore length 20 of both such shells may be lined with Babbitt or the like metal and accurately sized to provide an appropriate diametral clearance for wedge shaped film formation (see Fig. 6).

In this diagram, the definitely sized plain bore diameter $D_s$ is preferably kept slightly larger than the uniform journal diameter $D_j$ by twice the radial fit clearance designated $d$. When at rest, the finished surface of a conventional journal would normally drop into the shell valley or lowermost bedded contact position indicated by the dotted circle 22 having a journal center $O'$ which then lies beneath the bore center $O''$ by a distance equal to about $d$. When operating a horizontal rotor journal at full speed in the arrowed direction, a unitary unbroken wedge-shaped oil film will be established beneath its dead-load that bodily lifts the journal from its bedded into a typical full speed running position at an axial eccentricity marked $C$ having a radial lift of nearest approach or minimum oil film thickness $h_o$. For a heavily loaded rotor journal of the kind herein contemplated, the dimension $h_o$ is likely to assume a thickness somewhat larger than one thousandth of an inch.

When devoid of any counter loading, the center $O'$ tends to rise with increased speed but not beyond coincidence with the bore center $O''$. An impressed radial or applied unit load $P_j$ floatingly rides upon such continuous film and proportionately reduces the corresponding unloaded journal lift. At any given peripheral journal velocity, a wedge-shaped film provides for a rather definitely limited load upholding capacity per unit of projected bearing area when the journal is impressed into the film to the maximum permissible extent. Under such excessive or extreme loading, the limit of film buoyancy will be reached and thereby cause a fast running journal to break down its underlying film and drop into bedded metallic contact with the shell along the dotted profile outline indicated as 22.

While starting or stopping, the accompanying relative slow peripheral velocity curtails the normal journal upholding capacity that is inherent under full speed conditions. At a relatively slow journal speed, the effective portion of a built-up radial film counter-pressure will usually be confined to a localized valley region of the lower shell, such narrowed chordwise film being then depressed into an extremely thin condition. Whenever its limited load upholding power or critical slow speed journal pressure is exceeded, abrasive wear and tear may be expected to result in a proportionate relation to such excess pressure unless equipped with supplementary compensating means of the kind herein disclosed.

Certain serviceable combinations of journal and shell metals are found to possess characteristically different load carrying capacities after their respective interposed oil films have been broken down under extreme pressure. From extensive research studies, I have determined that when an oil film reaches a minute thickness on the order of around $\frac{1}{20000}''$ or less, rapid abrasion between loaded rubbing surfaces is likely to occur. That is to say, different mated bearing metals take on a distinctive inherent roughness when subjected to abrasion under extreme pressure, irrespective of the desired fineness of superficial finish that may initially have been imparted to such rubbing surfaces. In order to maintain a highly polished or superfinish between such surfaces, a rotating journal should at no time be allowed to come in direct abrasive contact with the main bore length 20 of its shell, otherwise the frictional drag goes over from a true fluid coefficient into a materially higher one characterized by abrasive behavior.

Figures 1, 2:
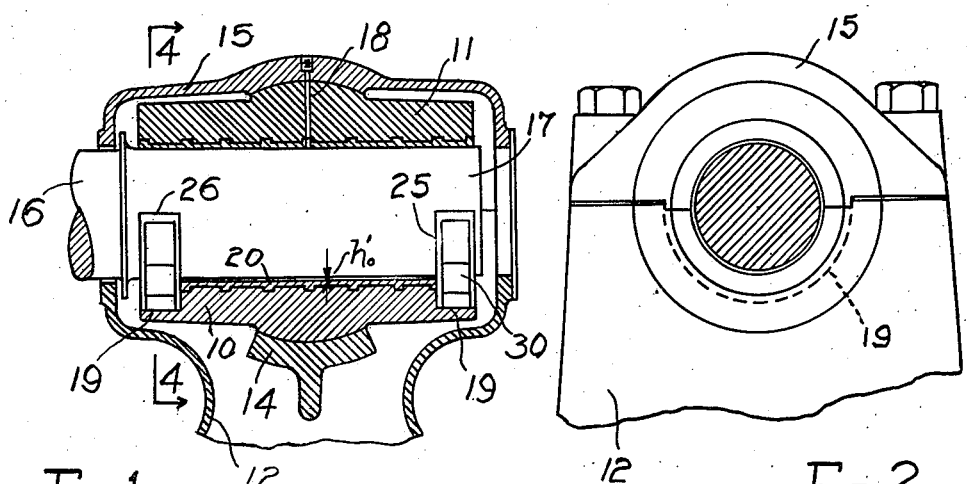

To meet this need, I provide for a supplemental or tandem step bearing upon which to provisionally seat the journal prior to allowing the film thickness $h_o$ to assume a minimum value so small that abrasive journal contact is likely to occur. It is preferred to resort to a series of distributed radial roller or ball bearing units for this purpose that do not wholly encircle the bore axis. Such inbuilt antifriction journal seating agency may be compactly confined into one or both counterbored ends of the lower shell 10 as shown in Fig. 1.

Figures 3, 4:
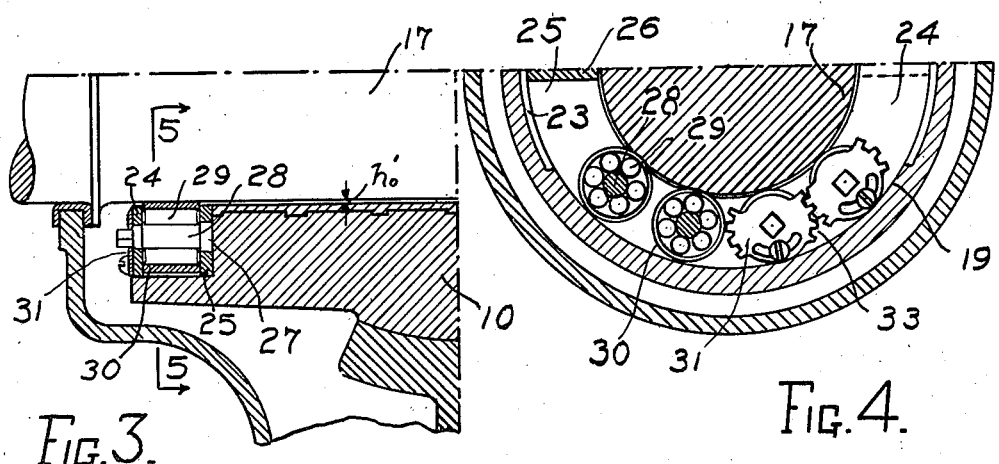
Fig. 3 shows an enlarged fragmental view clarifying certain details in the lower left quarter region of Fig. 1.
Fig. 4 depicts an end view as taken along line 4—4 of Fig. 1.

A semi-circular retaining cage may comprise laterally spaced twin side straps 24 and 25 shaped to snugly fit within each counterbore 19. Corresponding ends of these straps may be integrally interconnected by companion cross bars 26. As shown, such bars may respectively extend into alignment with the cap parting face and have the cap bolts tightly draw the outer cage perimeter into abutting engagement with the bottom of said counterbore so as to retain the straps in place against radial displacement. The inner cage perimeter is sized to clear the lowermost journal position. A plurality of inner races or eccentric pins may bridge the side straps in axial parallelism with the bearing bore. Opposed ends of each pin may be alignedly tapered at 27 as in Fig. 3 and provide for an interposed straight pin shank 28 that is slightly offset radially to constitute a roller compensating throw designated $e$.

A plurality of solid rollers or the equivalent double row ball elements 29 may be operatively mounted about each such shank and collectively housed within the hardened outer raceway 30 as an individual anti-friction unit. Each bearing unit is accurately sized and fitted to bring the radially innermost regions of their respective outer races into seating embrace with the lowered journal while running at slow speed and leave a relatively reduced bore clearance gap marked $h_o'$ (see Fig. 3) that shall be materially less than the full speed or normal journal lift $h_o$ of Fig. 6 but greater than the cited inherent surface roughness.

The precise radial adjustment of the outer raceways 30 is facilitated by the eccentric setting given to the inner race pins 28. One end of each pin may be equipped with a manipulative retainer plate 31 that when adjusted, may be selectively locked in place by any suitable means. Contiguous plate edges may be provided with meshing gear teeth 33 whereby to simultaneously follow up the several pin settings to a like degree. The throw dimension $e$ is purposely kept relatively small to permit of an accurate radial roller shift in fractional thousandths of an inch.

It will be observed that the film sustaining valley face of the plain bore length 20 and my stepped journal seating agency are preferably disposed in tandem at different radial levels and confined to a corresponding side of the journal axis. The roller contacting region of the journal may be case hardened and truly ground but such region need not necessarily be kept identical in diametral size with the oil borne journal portion.

In case of appreciable roller wear after protracted use, the shaft 16 may be jacked up after cap removal, when the released cage straps 25 and 26 may as a unit be dragged around and out of the assembled counterbore mouth. The mouth region of each semi-circular counterbore may be radially recessed at 23 to augment the cage clearance for servicing. After removal, the correct step readjustment of the several races 30 may be achieved by the employment of a suitable gig.

When the mated roller cages have been accurately preset and installed as intended, the journal while running at slower speed will be suspended thereacross to spacedly uphold the superficially polished journal portion away from its underlying shell bore length 29 by the minimum gap distance $h_o'$. Since such cleared spanning journal portion even when static, is not allowed to rest directly upon the highly finished shell bore, no journal abrasion can occur therebetween during the starting or stopping periods. After the rate of journal rotation has been sufficiently increased, a relatively thick wedge film will be established which automatically lifts the journal off its supplementary step support and freely raises the same by the height $h_o$ into its normal running position O' without being allowed to come into direct metallic contact with the upper shell portion. All rollers of my step agency operate intermittently and only rotate actively during the starting and stopping periods. Such disposition materially reduces roller wear and efficiently eases the starting drag without need of a conventional endless roller race that wholly circumscribes the journal axis. It is emphasized that an important aspect of the present invention resides in the use of plural outer races 30 whose diameters are respectively kept materially smaller than the journal diameter with which they cooperate.

When operating at slower speeds, an anti-friction roller per se is capable of carrying a high load intensity per inch of axial length without need of continuous lubrication. On the other hand, a wedge shaped oil film operates efficiently at high speeds but may seriously suffer in the event its oil supply should suddenly fail. Such failure would automatically drop the lifted journal on its supplemental step agency into a minimum allowable shell spacing $h_o'$. While not designed to run continuously at high speed, my relatively small roller units would in an emergency, under short life expectancy, be capable of protectively carrying the loaded journal at full speed until relieved from such arduous duty. In the case of a conventional plain shell subjected to a similar unit load, any unforeseen disturbance in oil supply is likely to bring about a hot box condition that may speedily lead to destructive journal seizure and sudden stalling of a high speed rotor. The present bearing equipment overcomes such difficulty in a simple low-cost manner without the installation of tiltable segmental bearing pads or a complete outer ball bearing raceway of a size greater than the journal diameter that would require the compact structural aspects of a conventional bearing housing to be materially recast and enlarged.

By the use of my rigid reserve step means, the allowable load $P_j$ per unit of projected journal area may with entire assurance be materially raised over conventional rotor bearing practice and its fitted plain shell correspondingly shortened without encountering any detrimental abrasive effects between the bearing elements. Because the shear resistance of an unbroken perfect oil film at full running speed remains substantially constant irrespective of its supported load, the accompanying frictional drag of my superfinished journal can safely be heavily loaded downwardly per unit of projected area to secure a correspondingly lowered fluid friction coefficient.

The foregoing disclosure will it is believed, make apparent to those skilled in bearing design, the more outstanding commercial advantages afforded over the priort art, it being understood that I reserve the right to modify the specifically disclosed structural features, all without departing from the spirit and scope of my invention heretofore described and more particularly characterized in the appended claims.

I claim:

1. In a protectively lubricated high speed twin bearing assembly serving to bridgingly uphold a horizontal shaft that carries a substantially constant downward rotor load, said bearings being axially aligned and each comprising a stationary shell member provided with a fixedly retained plain bore length of a definite diametral size, aligned journals for the opposed shaft end regions respectively having an initially finished cylindrical surface rotatively fitted to freely run in a mated bore length at a prescribed normal peripheral velocity and thereby establish interposed continuous wedge-shaped oil films that loadingly raise the journal axis into an eccentric running position confined beneath the bore axis without allowing either of said finished surfaces to come into direct abrasive contact with the circumscribing bore thereof, and a series of rigidly supported supplemental roller units for each such bearing and which units respectively comprise an outer raceway having a diametral size smaller than that of the journal, said raceways being cooperatively arranged in parallelism wholly below the level of the journal axis in adjacency with the valley region of a corresponding bore length to automatically take over and actively uphold the respective journal loads at starting speeds prior to the establishment of said interposed films and which journals remain freely lifted away from their respective roller units by said established films while the shaft continues to run at normal rotative speed.

2. In a protective high speed bearing assembly mounted to carry a substantially unidirectional radial load, a lubricated rigidly retained shell member provided with a plain horizontal bore length of fixed diametral size, a downwardly loaded journal having an initially finished cylindrical surface rotatively fitted to freely run in said bore length and after a prescribed normal peripheral velocity has been attained with respect to its starting speed, to establish an interposed continuous oil film adapted to floatingly elevate the journal surface clear of said bore confines into a normal eccentric running position, and a rigidly supported reserve seating agency comprising a series of roller bearings each including a separate outer raceway of a diametral size smaller than that of the journal and operatively arranged to run in parallelism with said bore length, said agency at starting speed prior to the establishment of said film serving to maintain the finished surface radially away from the valley of said bore length in a minimum spaced relationship and which journal is thereupon bodily lifted off said seating agency and automatically transferred upon the established film to remain borne thereon while the journal continues to run at normal rotative speed whereby to completely protect said initial surface finish of the loaded journal at all rotative speeds against direct abrasive contact with said bore length.

3. In a high speed radial bearing assembly, a lubricated horizontal shell member that provides for a rigidly retained plain bore length of a definite diametral size, a downwardly loaded journal having an initially finished cylindrical surface rotatively fitted to freely run within said bore length and after a prescribed normal peripheral velocity has been attained with respect to its starting speed to establish an interposed continuous oil film adapted to floatingly elevate the loaded journal surface clear of said bore length into a normal eccentric running position, and a rigidly supported supplemental seating agency including a row of roller units respectively including an outer raceway having a diametral size smaller than that of the journal and disposed within a finite arcuate length to partially circumscribe the journal axis whereby to maintain the finished surface radially away from said bore in a minimum spaced relationship and which units only become active during a starting period, said loaded journal being thereupon bodily lifted off said active roller units and automatically transferred upon an established film while the journal continues to run at normal rotative speed and during which running period all the outer raceways of said units are rendered wholly inactive and come to rest.

4. In a high speed radial bearing assembly, a lubricated horizontal shell member having a rigidly retained plain bore of fixed diametral size and which shell is axially split to include a lower component provided between the ends thereof with an arcuate counterbore of finite perimetric length, a downwardly loaded journal having an initially finished cylindrical surface rotatively fitted to freely run within said plain bore and after a prescribed normal peripheral velocity has been attained with respect to its starting speed, to establish an interposed continuous oil film adapted to floatingly elevate the loaded journal surface into a normal eccentric running position, a rigidly supported supplemental seating agency including antifriction bearing units each including an outer raceway whose diametral size is smaller than that of the journal, and means demountably installing said units within the confines of the aforesaid finite length and which agency at starting speed prior to the establishment of said film is arranged to maintain the finished surface radially away from the valley region of said bore length in a minimum spaced relationship, said agency being thereupon automatically relieved of the journal load by transfer to the established film while the journal continues to run at normal rotative speed 5. In a protectively lubricated high speed bearing assembly, the combination of a stationary shell member provided with a horizontal plain bore length, a radially loaded journal of fixed diametral size operatively fitted in said bore length and which journal while running at a prescribed normal peripheral velocity is automatically lifted off said shell bore by an interposed oil film, a cooperative supplemental step agency including a series of caged roller units each provided with an outer raceway having a diametral size smaller than that of the journal and distributed in axial parallelism about the journal axis, and selective compensating means for individually adjusting each of the roller units radially with respect to the journal axis.

6. In a high speed rotor sustaining bearing assembly or the like, a housed tubular shell provided with a lubricated plain horizontal bore, a radially loaded journal having an initially finished cylindrical surface of fixed diametral size and length rotatably fitted to freely run in maintained spaced relationship to the bore, said surface after attaining a prescribed normal peripheral velocity with respect to the superficial starting speed, being wholly borne by an established interposed oil film, and supplemental journal upholding means located in tandem beyond the length of said surface to include an endless outer roller race of a diametrical size smaller than that of the journal and which raceway is operatively installed into the shell housing and positively retained against both axial or radial translation, said race during each journal starting period prior to the establishment of the aforesaid film being further arranged to automatically assume and carry said loaded journal thereon in a reduced upheld relationship to said bore whereby to completely protect and preserve said initial surface finish at all rotative journal speeds against direct abrasive contact with any portion of the bore shell.

LOUIS ILLMER.